United States Patent
Chen et al.

(10) Patent No.: US 8,366,327 B2
(45) Date of Patent: Feb. 5, 2013

(54) COMMUNICATION MEDIA CONNECTOR

(75) Inventors: David Zhi Chen, Richardson, TX (US);
Vijay Jain, West Friendship, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 12/750,033

(22) Filed: Mar. 30, 2010

(65) Prior Publication Data
US 2011/0243513 A1 Oct. 6, 2011

(51) Int. Cl.
*G02B 6/255* (2006.01)
*G02B 6/38* (2006.01)
*G02B 6/36* (2006.01)

(52) U.S. Cl. ............ 385/95; 385/55; 385/60; 385/66; 385/78; 385/98

(58) Field of Classification Search .............. 385/53, 385/55, 58, 60, 66, 73, 75–78, 80, 88, 89, 385/92, 95, 98–101, 123, 125, 139
See application file for complete search history.

(56) References Cited

U.S. PATENT DOCUMENTS

| | | | | |
|---|---|---|---|---|
| 7,422,375 B2 * | 9/2008 | Suzuki et al. | ........... | 385/58 |
| 2008/0253726 A1 * | 10/2008 | Kurosawa et al. | ........... | 385/123 |
| 2009/0080841 A1 * | 3/2009 | Imamura | ........... | 385/96 |
| 2010/0054675 A1 * | 3/2010 | Benjamin et al. | ........... | 385/98 |

\* cited by examiner

*Primary Examiner* — Brian Healy
*Assistant Examiner* — Hung Lam

(57) ABSTRACT

A communication media having a first media portion defining a first end, a second media portion having first and second ends, the first end of the second communication media fused to the first end of the first media portion at a media joint, the second media portion configured to transmit data received from the first media portion; and a support sleeve disposed about the media joint. The support sleeve defines an end face, the second end of the second communication media terminating at an end surface parallel with the end face, the end face configured to be selectively connected to a media component.

22 Claims, 6 Drawing Sheets

COMMUNICATION MEDIA CONNECTOR

BACKGROUND

Communication networks may extend across great distances, in some cases stretching across cities, states, or even countries. These networks may employ fiber optic communication media that transmits data in the form of light. The optical fibers are physically connected to an optical interface through a connecting element, and light is transmitted and/or received at each interface.

Many types of optical fibers are used in communication networks. Optical fibers include bend-sensitive fibers and bend-insensitive fibers. Bend-sensitive fibers or bend-limited fibers are delicate and experience significant signal transmission loss across the fiber when bent or crimped beyond a minimum bend radius. By contrast, bend insensitive fibers experience substantially reduced signal transmission loss across the fiber when bent, and generally have a higher tolerance to damage caused by bending. The advantageous signal transmission properties of bend-insensitive fibers are due in part to a lattice structure of the bend-insensitive fiber that includes a plurality of spaces or voids in the material. However, the air voids also tend to accumulate dirt, debris, or moisture, especially at end surfaces of the fiber. Bend-insensitive fibers therefore experience relatively higher signal transmission loss junctions between the fiber and mating components, and for that matter anywhere else where the voids may become exposed, when compared to bend-sensitive fibers.

Accordingly, there is a need for a more robust communication media that tolerates bending and provides improved signal transmission loss qualities at connection interfaces between media components.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
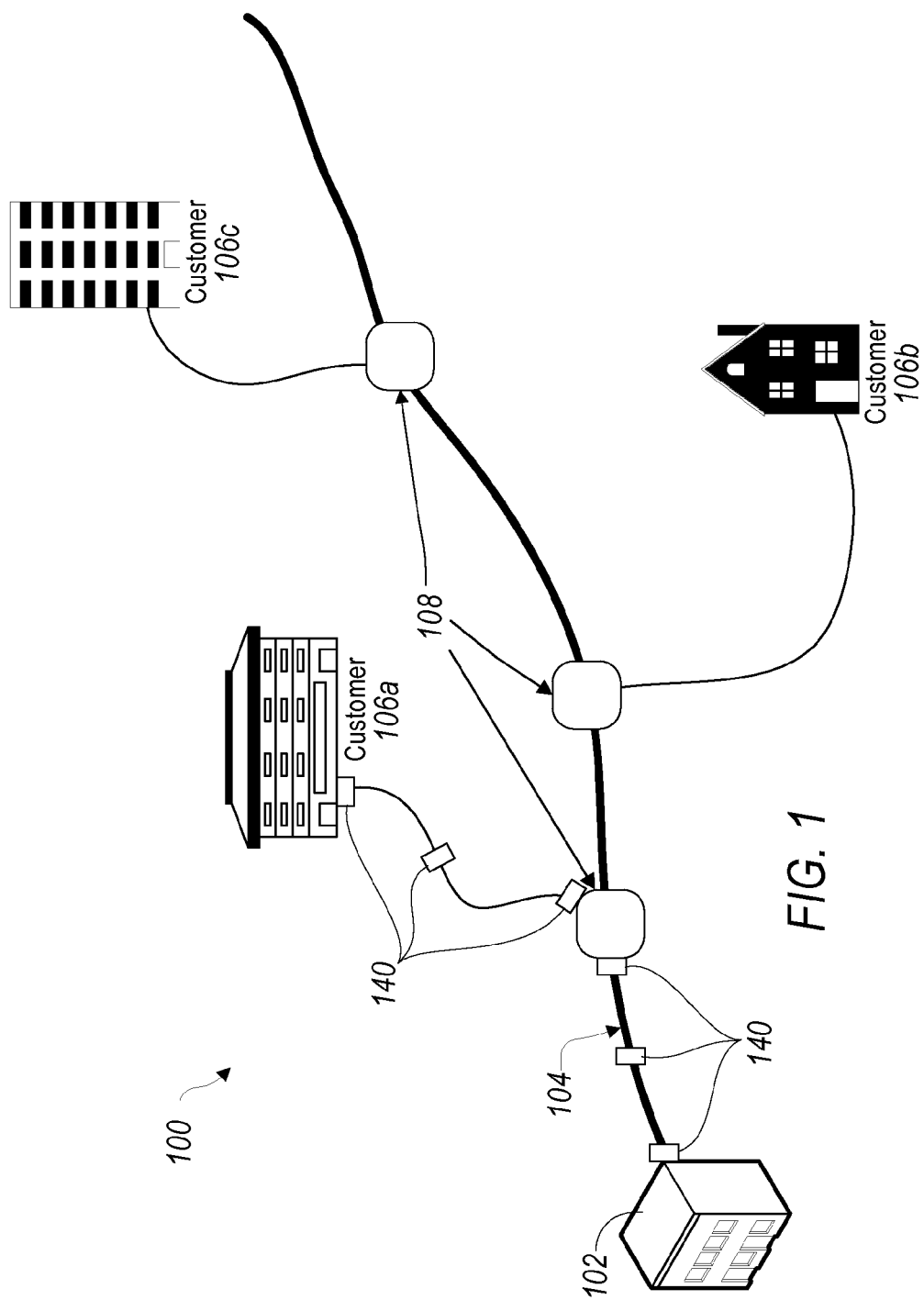
FIG. 1 illustrates an exemplary architecture of a communication system.

Various exemplary illustrations of a communication media connector are disclosed for use in connecting communication media for carrying electrical or optical signals, such as with communication systems. An exemplary communication media connector may generally include a support sleeve defining a cavity for receiving communication media. The support sleeve may generally define an outer shell having an aperture extending within the sleeve. The support sleeve may receive at least two media portions and aligns the media portions together at a media joint. A first one of the media portions may include a first end having a plurality of voids. The first end of the first media portion may be joined to at least a second media portion at the media joint, thereby enclosing the voids of the first media portion. The support sleeve may generally seal the joint from an outer environment, and define an end face that is aligned with an end surface of the second media portion. The second media portion and support sleeve may be configured to selectively transmit data received from the first media portion to a mating component.

An exemplary method may generally include providing a first media portion having a first end defining a plurality of voids. The method further may include fusing a first end of a second media portion to the first media portion to form a media joint between the first and second media portions that generally encloses the voids of the first media portion. The second media portion may be configured to receive data transmitted by the first media portion and transmit the data to a second end of the second media portion. The method may further include enclosing the media joint with a support sleeve having an end face that may be configured to be selectively connected to a mating communication component. The method may further include forming an end surface of the second media portion at the second end, with the end surface aligned with the end face of the support sleeve such that the end surface is configured to selectively transmit the data received from the first media portion to the communication component.

The exemplary media connector and support sleeve may be used in conjunction with any network, system or device, etc., that generally employs at least one communication media, lead, wire, cable, connector, or other conduit for providing communication between a component and any other mating component, e.g., elements of a network, system, device or the like. The support sleeve may inhibit intrusion of external contaminants, and may provide a substantially void-free connection interface for a mating component, thereby providing a link between a communication media line and the network, system, device, etc. that resists contamination from external contaminants. Accordingly, although the media connectors specifically described herein are illustrated as elements typically associated with communication networks, they may be utilized in any system relying on wired communication between adjacent components.

Turning now to FIG. 1, an exemplary communication system 100 is illustrated. The system 100 generally includes a central office 102 and a communication line or media 104 that provides communication signals to a plurality of customers 106. The communication media 104 may include any media configured to transmit data, e.g., optical fibers. In some exemplary illustrations, the communication media 104 includes optical fiber, as will be described further below. The system 100 may be in further communication with additional communications networks and/or systems (not shown), e.g., any known types of media distribution networks, packet-switched networks, telephone networks, or the like.

The system 100 may include a plurality of component assemblies 108 associated with a corresponding plurality of customer premises 106. Each component assembly 108 generally processes a signal transmitted through the communication media 104 to provide a desired signal, e.g., optical signals, media content, or the like, to/from an associated customer premise 106. Where the system 100 includes fiber optic components or media, the component assembly 108 may include any component that is convenient for generally processing optical signals transmitted through the communication media 104 to customer(s) 106. The communication media 104 may be secured to each communication component assembly 108 via the support sleeve 140, thereby allowing transmission of signals to/from the source 102 and customers 106.

Support sleeves 140 may generally be utilized generally without limitation throughout the system 100 to connect the communication media 104 or portions thereof to media components or other portions of communication media 104, thereby facilitating transmission of data via the communication media 104. The support sleeves 140 generally provide a sealed connection, for example by generally providing a stable connection between the communication media 104 and other component(s) to minimize signal transmission loss. For example, the support sleeves 140 may seal the communication media 104 from external contaminants such as moisture, dirt, or the like. The support sleeves 140 may also provide an increased stiffness compared with the communication media 104, thereby generally protecting the media 104 from bending of the media 104 above a predetermined limit, e.g., a minimum bend radius. The support sleeves 140 may further seal an interface between portions of the communication media 104.

In one exemplary illustration, a support sleeve 104 may be employed as a patch connector between portions of the communication media 104, e.g., to allow replacement of damaged portions communication media 104. In another example, a support sleeve 140 allows for selective connection of the communication media 104 to a customer premise 106 or component assembly 108, thereby allowing transmission of data to/from the communication media 104. Accordingly, support sleeves 104 may be used anywhere within system 100 to provide an interface between the communication media 104 or a portion thereof and another component in the system 100 or another portion of the media 104, thereby generally permitting transmission of data between the media 104 and a component or other portion of the media 104.

As described above, in some exemplary illustrations the communication media 104 may be an optical media line in the form of optical fibers. Exemplary optical fibers may include "single mode" fiber, which generally supports transmission of an optical signal in a single direction along the fiber. More specifically, a single mode fiber may allow a single propagation mode per polarization direction for a given wavelength. Single mode fibers generally provide relatively low signal transmission loss along the communication media 104, but may also be generally sensitive to transmission loss and damage when the media 104 is bent, for example where the communication media 104 is connected to another component, or in transitions in the path of the communication media 104.

Another exemplary optical fiber is a photonic crystal fiber, also known as "hole assisted" or "bend-insensitive" fibers, which transmit signals through a spatially varying glass composition that includes air voids distributed throughout the fiber material. Hole-assisted fibers have generally superior bending properties relative to single-mode fibers, e.g., as they typically suffer less signal transmission loss during bending of the fiber. However, hole-assisted fibers are susceptible to signal transmission loss at connection interfaces due to the air voids or "holes" in the fiber material. For example, voids at or adjacent a connection interface of a hole-assisted fiber generally easily become clogged with dirt, moisture, or other external contaminants that increase signal transmission losses. By comparison, single-mode fibers are relatively resistant to signal transmission loss due to contaminant clogging, as they have a substantially void-free internal structure, thereby generally resisting accumulation of external contaminants.

The support sleeve 140, as will be discussed in greater detail below, in one exemplary illustration provides a single mode fiber, e.g., as the second media portion 120, that is fused to a hole-assisted fiber, e.g., as the first media portion 110, to provide a single mode end face geometry for greater signal strength at the support sleeve 140 communication interface with the component assembly 108. For example, as will be described further below, a single mode end face geometry generally provides a planar end surface that is substantially without voids, pits, or other undulations that may collect contaminants and lead to increased signal transmission loss across the end surface, e.g., as is typical for hole-assisted fibers.

Figure 2:
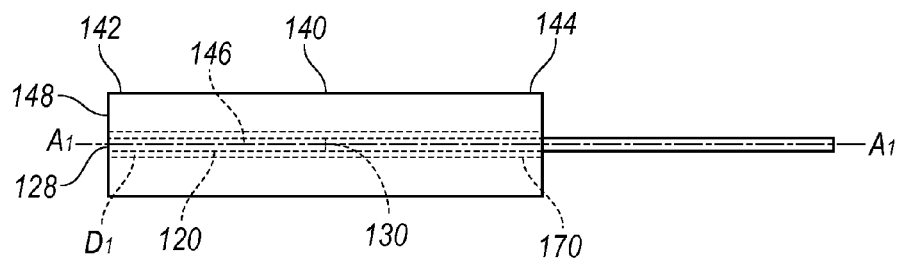
FIG. 2 illustrates an exemplary support sleeve with first and second media portions joined together within the support sleeve and a generally planar first end of the first media portion.

Turning now to FIG. 2, a cross-sectional view of an exemplary communication media connector or support sleeve 140 is illustrated showing first and second media portions 110, 120 that are joined at a media joint 130. The support sleeve 140 may be selectively connected with connection interfaces of the component assembly 108, customer 106, service provider 102, patch cables in the communication media 104, or any other mating component that is convenient.

An end surface 128 of the second media portion 120 is generally aligned with an end face 148 of the support sleeve 140 to allow the second media portion 120 to transmit data, e.g., optical data, with a mating component. The second media portion 120 thus defines an end surface 128 that is positioned relative to the end face 148 of the support sleeve 140 such that the end surface 128 is placed in communication with communication media of the mating component. In the exemplary illustration shown in FIG. 2, the end surface 128 is coplanar with the end face 148 of the support sleeve 140. More specifically, the support sleeve first end 142 includes an end face 148 that is generally co-planar and/or substantially perpendicular to a longitudinal axis $A_1$ that runs through a longitudinal center line of the aperture 146. Alternatively, the end surface 128 of the second media portion 120 may extend beyond the end face 148 or be recessed within the aperture 146.

The aperture 146 diameter $D_1$ may be greater than a diameter of the communication media 104 that is to be inserted to provide a gap for a stabilizing material 170 provided in the gap. The support sleeve 140 may provide lateral support to the communication media 104 and/or media joint 130, e.g., with the stabilizing material 170 acting against the outer diameter $D_1$ of the aperture 146, as will be described further below.

Figure 3A:
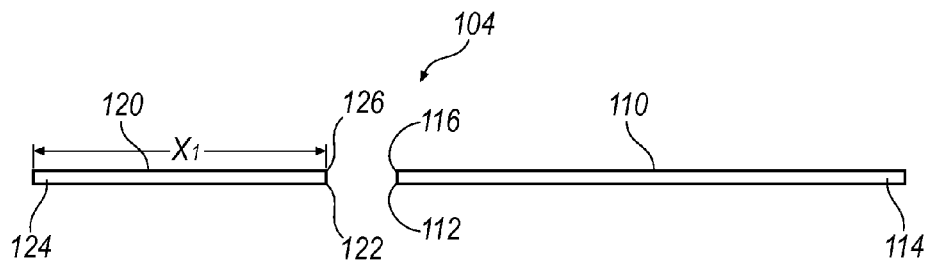
FIG. 3A illustrates a side view of exemplary first and second media portions prior to joining.

Turning now to FIG. 3A, the first and second media portions 110, 120 of the communication media 104 are shown in further detail. The first media portion 110 may carry data, e.g., an optical signal originating from the central office 102, and transmit the data to the second portion 120 via the media joint 130. As will be described further below, the second portion 120 in turn may terminate at an end surface 128, thereby defining a connection interface that may be selectively connected to another component (not shown in FIG. 3A) in system 100, thereby permitting transmission of data, e.g. via an optical signal, to the component. For example, as described above such components may include a junction box or other connector associated with one of the customers 106, component assemblies 108, or other portions of the communication media 104.

The first media portion 110 and the second media portion 120 may be of any known optical media communication media 104, such as, but not limited to, single mode fiber and photonic crystal hole-assisted fiber. In one exemplary illustration, the first media portion 110 is a hole-assisted fiber that includes voids or spaces adjacent and/or at a first end 112 of the first media portion 110, as will be described further below. The first media portion 110 may carry an optical signal transmitted from the central office 102 for one or more of the customers 106, e.g., from a second end 114 of the first media portion 110 to the first end 112.

The second media portion 120 may extend from a first end 122 that is adjacent the first end 112 of the first media portion 110 to a second end 124 that provides a connection interface for selective connection to a component of the system 100, as will be described further below. In one exemplary illustration, the second media portion 120 is an optical fiber of a generally solid construction, i.e., substantially without voids or spaces in the material forming the second media portion 120. For example, the second media portion 120 may be a single-mode fiber. The second media portion 120 may define a predetermined length $X_1$ between the first and second ends 122, 124. As will be described further below, the predetermined length $X_1$ can be used to determine a position of the first end 122 of the second media portion 120 after insertion to a support sleeve 140 (not shown in FIG. 3A).

The first ends 112, 122 of the first and second media portions 110, 120 generally define corresponding end surfaces 116, 126 that are joined together to allow signal transmission from the first media portion 110 to the second media portion 120. For example, the end surfaces 116, 126 may be prepared by removing any protective coating that may be present on the end of each media portion 110, 120. The preparation process may also include cleaving the ends 112, 122 of the media 110, 120 by using a score-and-break method. After cleaving, the resulting end surfaces 116, 126 may be inspected using a microscope to ensure the end surfaces do not include any irregularities or fissures that would otherwise impair signal transmission. The end surfaces 116, 126 may also be polished to enhance end surface quality, e.g., by providing a generally smooth and planar end surface 116, 126, thereby reducing signal loss otherwise resulting from any irregularities in the end surfaces 116, 126.

Figure 3B:
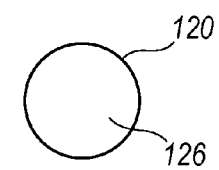
FIG. 3B illustrates an end view the exemplary second media portion of FIG. 3A.
Figure 3C:
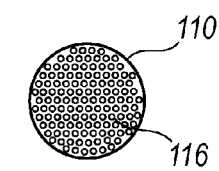
FIG. 3C illustrates an end view of the exemplary first media portion of FIG. 3A.
Figure 3D:
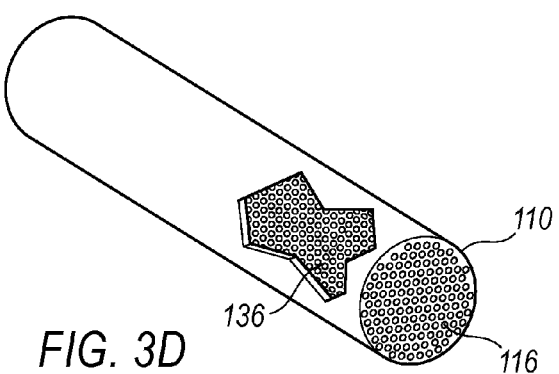
FIG. 3D illustrates an isometric view of the first media portion end surface of FIGS. 3A and 3C.

Turning now to FIGS. 3B, 3C, and 3D, the first ends 112, 122 of the first and second media portions 110, 120, respectively, are illustrated in further detail according to the exemplary illustration described above where the first media portion 110 is a hole-assisted fiber and the second media portion 120 is a void-free fiber, e.g., a single-mode fiber. FIG. 3B illustrates a single mode fiber having a smooth and generally planar surface 126 as a result of a generally solid or void-free construction of the second media portion 120. By contrast, FIGS. 3C and 3D illustrate the first media portion 110, which is formed of a hole-assisted fiber lattice structure having a plurality of voids 136 positioned generally randomly throughout the length of the first media portion 110. Accordingly, a generally planar end surface 116 of the first media portion 110 defines a plurality of undulations or pockets in the end surface 116 that result from the intersection of the voids 136 with the end surface 116. While the voids 136 illustrated in FIGS. 3C and 3D are generally spherical in shape, the voids may define any three-dimensional shape within the first media portion 110. Merely as examples, the voids 136 may alternatively define a cubic, pyramidal, or octagonal shape as part of a lattice structure of the first media portion 110.

Figure 4:
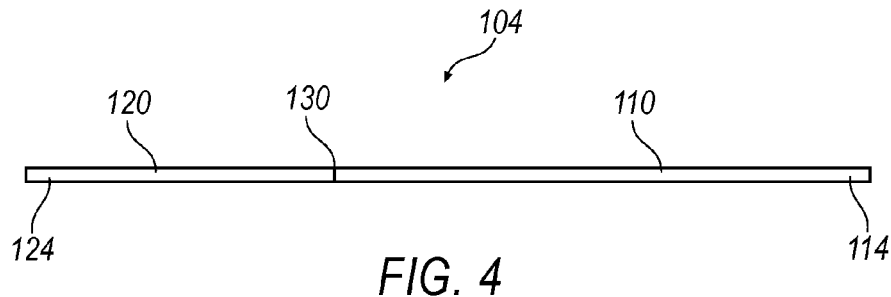
FIG. 4 illustrates side view of exemplary first and second media portions joined together.

Turning now to FIG. 4, communication media 104 is illustrated with the first ends 112, 122 of the media portions 110, 120 spliced together, e.g., after cleaving and/or polishing of the ends 112, 122. The ends 112, 122 may be joined in any process that is convenient. Fusion splicing is employed in one exemplary illustration, and may generally result in a more reliable splice between optical fibers, e.g., by achieving lower insertion and/or return loss and/or greater long-term reliability, as compared with other methods of joining optical fibers. However, any other splicing or joining method may be employed that is convenient, e.g., mechanical splicing, optical fiber adhesives, etc. Fusion splicing generally utilizes localized heat to melt or fuse the ends of the media portions 110, 120 together. For example, an electric arc, a laser or gas flame may be used to create the localized heat and generally weld the first and second media portions 110, 120 together. The fusing process may also include the use of a splicing fixture to position the two media portions 110, 120 and align the end surfaces 116, 126 to create a fused media joint 130, thereby forming a continuous communication media 104 from the first and second media portions 110, 120. Further, the fusion process may be used where the first and second media portions 110, 120 are formed of different materials, e.g., the single-mode fiber and hole-assisted fiber materials described above.

Figure 5A:
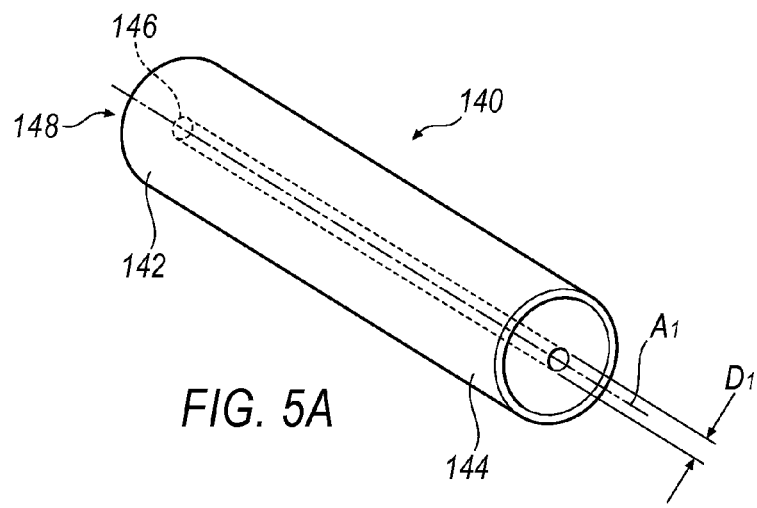
FIG. 5A illustrates an isometric view of an exemplary support sleeve having a longitudinally extending aperture with at least a generally constant diameter.

Turning now to FIG. 5A, an isometric view of an exemplary support sleeve 140 is illustrated. The support sleeve 140 may be made from a non-conductive material such as, but not limited to, ceramic and porcelain. The support sleeve 140 cross-section may be of any shape or configuration that is convenient. Merely as examples, exemplary support sleeves may define a generally square, rectangular, oval, or circular shape. The shape of the support sleeve may correspond to a mating component or receptacle (not shown), e.g., on component assembly 108, a junction box at the central office 102 or customer 106, splice connector of communication media 104, etc.

The support sleeve 140 may include a first end 142, a second end 144, and a through aperture 146 configured to receive the communication media 104, e.g. the first and second media portions 110, 120. The end face 148 may also provide a positive stop or locating feature for inserting the support sleeve 140 into a mating component (not shown in FIG. 5A), e.g., component assembly 108, a receiver at the customer 106, patch cable, or the like. The support sleeve 140 aperture 146 has at least a generally continuous single diameter $D_1$ for receiving various diameters of communication media 104.

Figure 5B:
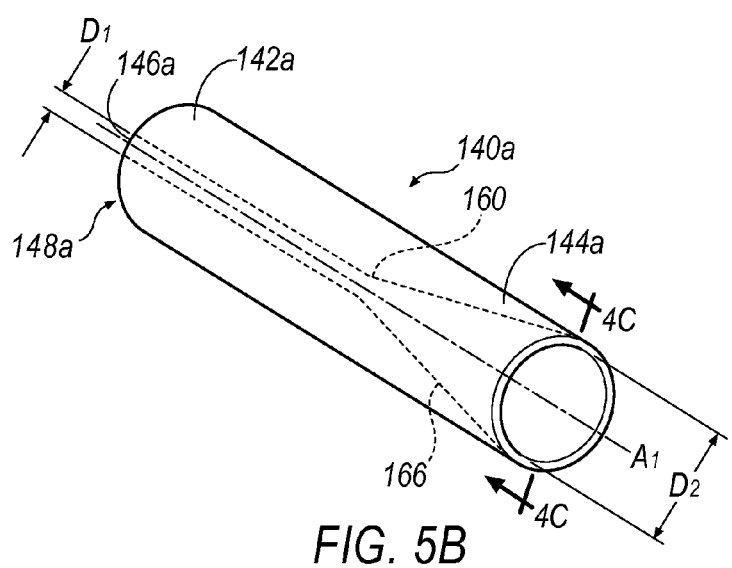
FIG. 5B illustrates an isometric view of an exemplary support sleeve having a frusto-conical aperture portion.

Turning now to FIG. 5B, an isometric view of another exemplary support sleeve 140a is illustrated. The support sleeve 140a is similar to the above-mentioned support sleeve 140, but the aperture 146a is modified such that a support sleeve 140a first end 142a includes a first aperture diameter $D_1$ and a support sleeve 140a second end 144a includes a second aperture diameter $D_2$. The second aperture diameter $D_2$ may be larger than the first aperture diameter $D_1$ or the first aperture diameter $D_1$ may be larger than the second aperture diameter $D_2$. The support sleeve 140a may also include an aperture transition region 160 where the support sleeve first diameter $D_1$ transitions and angles outwardly to create a frusto-conical end 166 that terminates at the second end 144a. The frusto-conical end 166 may be at various angles based on, for example, a diameter of the communication media 104 received therein.

Figure 5C:
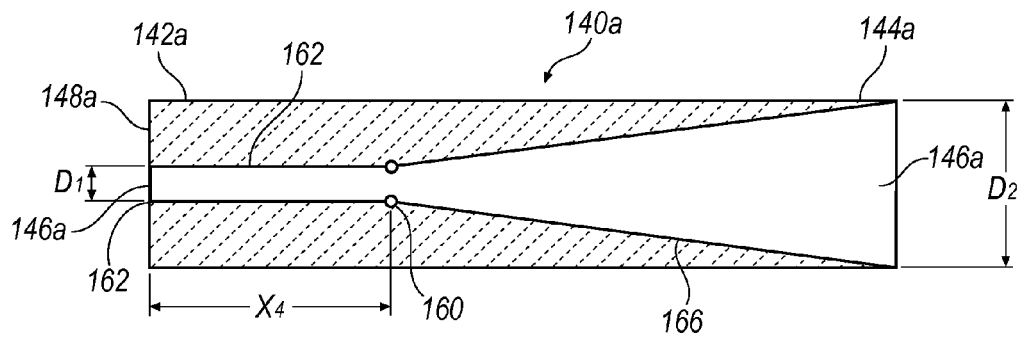
FIG. 5C illustrates a section view of an exemplary frusto-conical support sleeve.

FIG. 5C illustrates a cross-sectional view of the frusto-conical support sleeve 140a prior to insertion of the communication media 104 taken longitudinally along the center line axis $A_1$. The support sleeve transition region 160 is illustrated at approximately the midpoint of the support sleeve 140a and signifies the point at which at least a generally continuous diameter $D_1$ transitions to the angled portion, thereby creating the frusto-conical end 166. An angle or slope of the frusto-conical portion may vary depending on the application as well as the addition of multiple communication media 104 within one support sleeve 140a, as will be described further below. Additionally, the transition region 160 may be positioned anywhere along the longitudinal axis $A_1$ of the support sleeve 140a. The transition point 160 may be positioned a predetermined distance $X_4$ may be equivalent to a distance that the media joint 130 is positioned from the end face 148a of the sleeve 140a, as will be described further below.

The different aperture diameters $D_1$, $D_2$ of the support sleeve 140a may advantageously prevent joint diameter offset between the first and second media portions 110, 120 (not shown in FIG. 5B). Joint diameter offset may occur when the first and second media portions 110, 120 shift laterally with respect to each other within the support sleeve 140, 140a creating a signal loss at the joint 130. In other words, the joint 130 (not shown in FIG. 4B) may become dislodged or misaligned, resulting in a partial or total loss of signal transmission across the joint 130. The angled or frusto-conical support sleeve 140a may generally inhibit or prevent joint diameter offset by allowing additional lateral compliance between the media at the larger end of the support sleeve 140a, as will be described further below.

Figure 6:
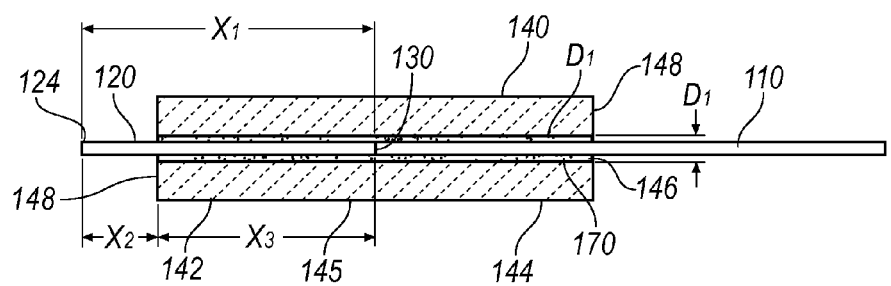
FIG. 6 illustrates a partial section view of an exemplary support sleeve with first and second media portions joined together within the support sleeve.
Figure 7:
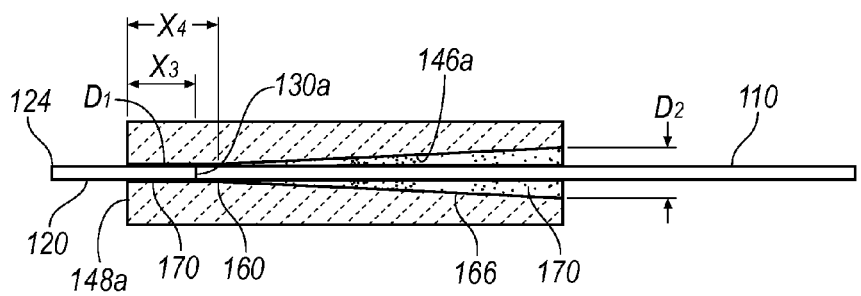
FIG. 7 illustrates a partial section view of an exemplary support sleeve having a frusto-conical end with first and second media portions joined together within the support sleeve.

As described above, a space or gap between the communication media 104 and interior surfaces of the support sleeves 140, 140a may be filled with the stabilizing material 170 to protect and stabilize the media joint 130. For example, as shown in FIGS. 6 and 7, the stabilizing material 170 may provide internal stability to the communication media 104 by bonding the communication media 104 to the lateral surface of the aperture 146 within the support sleeve 140, e.g., the at least generally continuous diameter aperture portions $D_1$ of support sleeve 140, or frusto-conical side surfaces 166 of the support sleeve 140a. The stabilizing material 170 may also seal the media joint 130, preventing external contaminants, e.g., dirt, moisture, or debris, from reaching any exposed voids of hole-assisted fiber of the first media portion 110. The stabilizing material 170 may be any sealing or bonding agent that is convenient, e.g., an epoxy such as an ambient air set epoxy, a thermoset epoxy, or an optical bonding agent. The support sleeves 140, 140a may be filled with stabilizing material 170 either before or after insertion of the communication media 104 into the sleeves 140, 140a.

FIGS. 6 and 7 illustrate a longitudinal cross-sectional view of the exemplary support sleeves 140 and 140a with the communication media 104 inserted into the apertures 146, 146a. The media joint 130 may be positioned at a predetermined distance $X_3$ from the end faces 148, 148a of the support sleeves 140, 140a, respectively. The predetermined distances $X_3$ are determined by measuring an exposed length of the communication media 104 protruding from the support sleeves 140, 140a. For example, as shown in FIG. 6 the second media portion 120 protrudes beyond the end face 148 of the support sleeve 140 by exposed length $X_2$ prior to any cleaving of the second media portion 120. Accordingly, a position of the media joint 130 may be determined by subtracting the exposed length $X_2$ of the second media portion 120 from the distance $X_1$ of the second media portion 120. The exposed length $X_2$ may be subsequently cleaved or otherwise removed such that the end of the second media portion 120 is aligned with the end face 148, 148a of the support sleeve 140, 140a, as will be described further below.

The media joint 130 may be positioned a predetermined distance $X_3$ from the end face 148, 148a that is great enough to securely fasten the second media portion 120 and/or the media joint 130 within the support sleeves 140, 140a. For example, the predetermined distance $X_3$ is large enough to secure the second media portion 120 within the support sleeve 140, e.g., to generally prevent longitudinal or lateral shift of the second media portion 120 with respect to the support sleeve 140 and/or first media portion 110. In one exemplary illustration, the predetermined distance $X_3$ is at least approximately 2 centimeters (cm). Further, in the exemplary illustration of FIG. 7, the media joint is positioned between the end face 148a and the transition region 160 of the support sleeve 140a. More specifically, the predetermined distance $X_4$ that the transition region 160 is positioned with respect to the end face 148a is greater than the predetermined distance $X_3$. This may provide additional support to the media joint 130a, as the aperture 146a is narrower adjacent the media joint 130a. Alternatively, the predetermined distance $X_4$ may be less than the predetermined distance $X_3$, such that the media joint 130a is positioned within the frusto-conical portion of the aperture 146a. Positioning the media joint 130a in the frusto-conical portion may lend greater compliance to the joint 130a, e.g., due to the additional stabilizing material 170 positioned laterally between the joint 130a and the interior surfaces of the aperture 146a.

Figure 8:
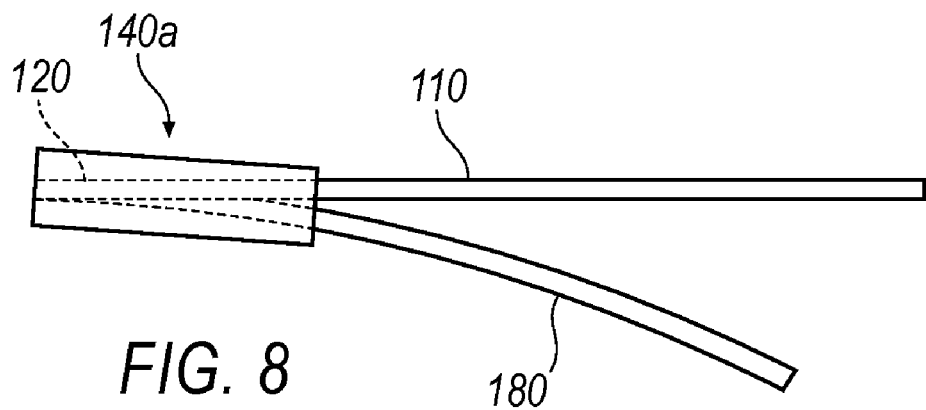
FIG. 8 illustrates an exemplary support sleeve joining first, second and third media portions together.
Figure 9:
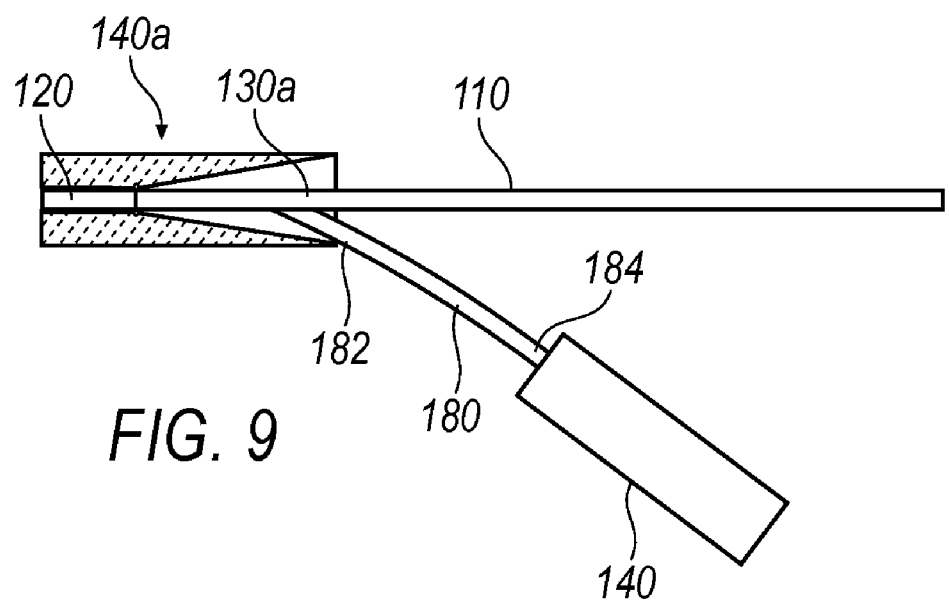
FIG. 9 illustrates a partial section view of the exemplary support sleeve and first, second and third media portions of FIG. 8, with a second support sleeve affixed on an end of the third media portion.

Now turning to FIGS. 8 and 9, an exemplary verification communication line 180 is provided utilizing the frusto-conical support sleeve 140a. The angled portion of the frusto-conical end 166 allows for multiple communication media 110, 120, 180 to be fused together within support sleeve 140a. More specifically, the first and second media portions 110, 120 may be joined at a media joint 130a, while the verification communication line 180 interfaces with the first media portion 110 at or adjacent the media joint 130a. This provides the operator with the ability to monitor optical performance utilizing the verification communication line 180. The verification communication line 180 may allow a portion of the signal transmitted along the first media portion 110 to be transmitted to the verification line 180, thereby allowing monitoring of the signal. For example, an optical grating or optical isolator may be used to reflect an optical signal carried in the first media portion 110 to the verification line 180. Typically a diverted portion of the signal is relatively small to minimize signal transmission losses across the interface between the first and second media portions 110, 120 and the verification line 180. In one exemplary illustration, the verification line 180 receives 2% of the total signal power. The verification line 180 includes a first end 182 and a second end 184 with the first end 182 being fused to the first and second media portions 110, 120 at the media line fused joint 130a. After fusing the three media 110, 120, 180 together, the frusto-conical support sleeve 140a may be slid over the joint 130a to protect and secure the joint 130a and interface between the verification line 180 and first media portion 110. Additionally, the second end 184 of the verification line 180 may include an optical isolator (not shown) or optical grating (not shown) to either stop the reflection or enhance the optical reflection for monitoring and field trouble shooting. In some exemplary illustrations, a fiber grating may be temperature sensitive such that variations in temperature of the fiber grating increase or decrease light transmission through the grating. Further, the verification line 180 second end 184 may include a support sleeve 140 for selective connection to additional inspection and testing equipment (not shown).

Figure 10:
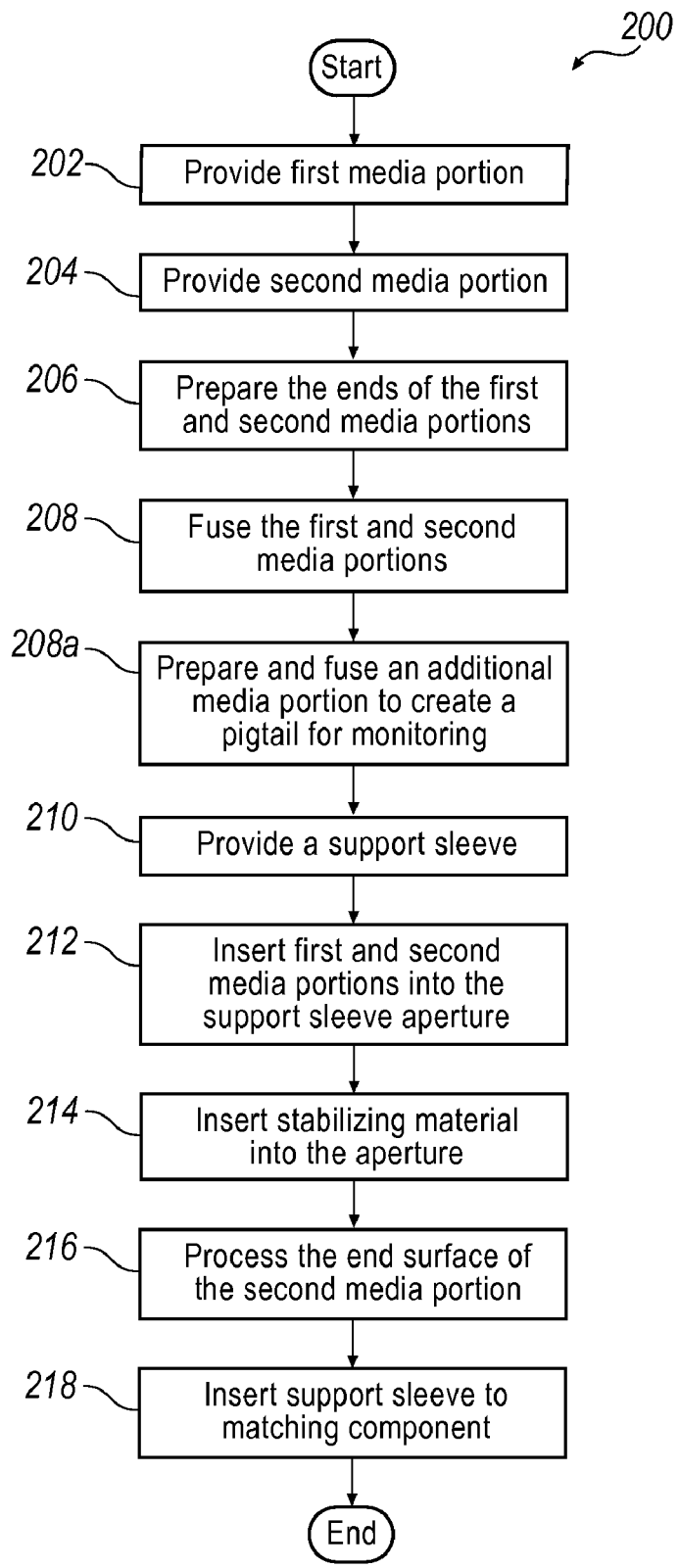
FIG. 10 illustrates an exemplary process flow diagram of a method of assembling an exemplary communication media connector.

Proceeding now to FIG. 10, an exemplary process 200 for assembling a support sleeve 140, 140a for communication media 104 is described. Process 200 may begin at block 202, where a first media portion is provided. For example, as described above a first media portion 110 may be provided in a media distribution system 100 to generally allow data transmission between a media source 102 a plurality of customers 106.

Proceeding to block 204, a second media portion is provided, e.g., second media portion 120. The second media portion 120 may have a known predetermined length $X_1$ for determining placement of a media joint 130 between the first and second media portions 110, 120, as will be described further below. Process 200 may then proceed to block 206.

In block 206, adjacent ends of the first and second media portions 110, 120 may be prepared for joining the ends together, e.g., by cleaving and/or polishing the ends. For example, the ends 112, 122 of the first and second media portions 110, 120 may be cleaved to form end surfaces 116, 126, respectively. The end surfaces 116, 126 may subsequently be polished to promote adhesion of the two end surfaces 116, 126 together.

Process 200 may then proceed to block 208, where the two processed ends 112, 122 are aligned and fused together to join the two media portions 110, 120. As described above, fusing the ends 112, 122 together may include any process that is convenient, such as laser welding or adhesive bonding, merely as examples. In some exemplary illustrations, the first and second media portions 110, 120 are formed of different materials. For example, the first media portion 110 may be a hole-assisted optical fiber defining a plurality of voids, e.g., voids 136 in the material. As described above hole-assisted fibers advantageously tend to resist signal transmission loss due to bending. Further, the second media portion 120 may be formed of a solid optical fiber material, e.g., a single-mode fiber that is substantially without any voids, thereby providing reduced signal transmission loss at an interface between the second media portion 120 and a mating component. Accordingly, joining a single mode fiber with a hole-assisted fiber creates a generally continuous communication media 104 having an end face geometry that is substantially without voids or other undulations on the surface, while the more robust hole-assisted optical fiber material resists signal transmission loss due to bending in areas outside of the support sleeve 140, 140a.

In one exemplary illustration, process 200 proceeds to block 208a, where a third media portion, e.g., a verification communication line 180 or pigtail, is fused to the first media portion 110. For example, as described above a verification communication line 180 may be fused to first media portion 110 at or adjacent a media joint 130a between the first and second media portions 110, 120, thereby allowing an optical signal transmitted through communication media 104 to be monitored.

Process 200 may then proceed to block 210, where a support sleeve 140, 140a is provided to the first and second media portions 110, 120. The support sleeve 140 may have at least a generally constant diameter aperture 146. Alternatively, a varying diameter aperture 146a may be provided, e.g., as described above in regard to support sleeve 140a. More specifically, the aperture 146a may include a first diameter $D_1$ adjacent a first end of the support sleeve 140a, and a second larger diameter $D_2$ adjacent an opposite end of the support sleeve 140a. The aperture 146a may be frusto-conical along a portion of the sleeve 140a that extends away from an aperture transition where the frusto-conical and at least generally constant-diameter portions meet. A range of slopes or grades along the frusto-conical end may work. For example, a slope of the frusto-conical end may be determined based on a number of media portions provided within the sleeve 140a. More specifically, where three media portions 110, 120, 180 are provided, the frusto-conical aperture 146a may advantageously allow additional space for the three media portions 110, 120, 180 and a joint 130a between the media portions 110, 120, and/or 180 with a greater slope.

Proceeding to block 212, the known distance $X_1$ of the fused communication media 104, which may correspond to a known initial length of the second media portion 120, is slid into the aperture 146, 146a of the support sleeve 140, 140a. More specifically, the second media portion 120 may be slid into the support sleeve 140, 140a such that an exposed length $X_2$ of the second media portion 120 is left protruding from the end face 148, 148a. Accordingly, the known distance $X_1$ and exposed length $X_2$ of the second media portion 120 may be used to determine a desired spacing or predetermined distance $X_3$ of the media joint 130 from the end face 148, 148a of the support sleeve 140, 140a. The predetermined distance $X_3$ or joint fusing distance may thereby provide sufficient lateral support for the joint within the aperture of the support sleeve 140, 140a, and generally prevent shifting of the joint 130, 130a. In one exemplary illustration, the distance $X_3$ is at least two centimeters. Additionally, where aperture 146a includes a frusto-conical portion, the predetermined distance $X_3$ may be large enough such that a media joint 130a is generally positioned approximately at an aperture transition between the frusto-conical and at-least generally constant diameter portions of the aperture 146a.

Process 200 may then proceed to block 214, where a stabilizing material 170 is inserted into the sleeve 140, 140a to fill a gap or space between the communication media 104 and interior walls of the aperture 146, 146a within the sleeve 140, 140a. The stabilizing material 170 may be cured, e.g., by applying heat or in an air curing process, depending on the stabilizing material employed and configuration of the first and second media portions 110, 120. The stabilizing material 170 may be inserted into the support sleeve 140, 140a before or after positioning the communication media 104 within the support sleeve 140, 140a.

Proceeding to block 216, the end surface 128 of the second media portion 120 may be processed, e.g., by cleaving and/or polishing the end surface 128 as described above. More specifically, the end 124 of the second media portion 120 may be cleaved to facilitate breaking a portion of the second media portion 120 away to form a substantially planar end surface, e.g., end surface 128.

A general type or configuration of end surface 128 may be adapted to a mating component, e.g., a signal processor, junction box, patch cable, etc., for which the support sleeve 140, 140a is intended. For example, the end surface 128 of the communication media 104 may extend past the end face 148, 148a of the support sleeve 140, 140a by a predetermined distance. Alternatively, the end surface 128 may be generally flush, e.g., co-planar and/or parallel, to an end face 148, 148a of the support sleeve 140, 140a. As another alternative, the end surface 128 may be recessed within the aperture 146, 146a.

Process 200 may then proceed to block 218, where the support sleeve 140, 140a, and finished end surface 128 are inserted into a mating component, e.g., a signal processor, junction box, patch cable, etc.

Accordingly, the support sleeve 140, 140a and process 200 generally provide a robust communication media, e.g., a hole-assisted fiber, with an end face geometry that provides improved signal transmission loss characteristics at an interface between the support sleeve 140, 140a and a mating component. The support sleeve 140, 140a thus prevents signal transmission loss that may otherwise occur when voids of a hole-assisted fiber are exposed to external contaminants such as moisture, dirt, or debris. Further, the support sleeve 140, 140a provides a stable interface between the media portions 110, 120, e.g., a hole-assisted fiber and single-mode fiber, preventing signal transmission loss due to shifting of the media portions 110, 120 relative to one another.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A communication media connector, comprising:
   a first media portion with a plurality of voids located at a first end;
   a second media portion having first and second opposing ends, the first end of the second communication media joined to the first end of the first media portion at a media joint enclosing the plurality of voids, the second media portion configured to transmit data received from the first media portion; and
   a support sleeve disposed about the media joint, the support sleeve defining an end face, the second end of the second communication media defining an end surface aligned with the end face such that the end surface is configured to selectively transmit the data received from the first media portion to a receiving element;
   wherein the support sleeve defines an aperture extending through an entire length of the support sleeve, the aperture having a first internal diameter and expanding to a second internal diameter larger than the first internal diameter; and
   wherein the joint and the first and second media portions are secured within the support sleeve by a stabilizing material disposed laterally with respect to the joint, thereby providing lateral support against an interior surface of the support sleeve; wherein the stabilizing material extends laterally from the first media portion to the interior surface at the second internal diameter.

2. The communication media connector of claim 1, wherein the support sleeve and the second media portion cooperate to generally protect the plurality of voids from an external contaminant.

3. The communication media connector of claim 2, further comprising a third media portion joined to the first media portion, wherein the first end of the second media portion defines a generally planar surface fused to the first end of the first media portion.

4. The communication media connector of claim 1, wherein the first media portion is made of a first communication material and the second media portion is made of a second communication material different from the first material.

5. The communication media connector of claim 4, wherein the first media portion is an optical fiber configured to transmit data only in a first direction.

6. The communication media connector of claim 1, wherein the support sleeve aperture includes at least a generally constant diameter portion extending a predetermined distance, the aperture including a frusto-conical portion widening from the generally constant diameter portion.

7. The communication media connector of claim 6, wherein the frusto-conical portion terminates at the support sleeve end face.

8. The communication media connector of claim 1, wherein the support sleeve aperture extends from a first end of the support sleeve to an aperture transition representing at least a generally constant diameter, the at least generally constant diameter being larger than a diameter of the first media portion, the aperture sloping outwardly from the aperture transition region extending toward the end face of the support sleeve opposite the first end.

9. The communication media connector of claim 8, wherein the aperture slopes outwardly from the aperture transition region at a generally constant slope.

10. The communication media connector of claim 1, wherein the media joint is positioned at least approximately two centimeters from the support sleeve end face.

11. The communication media connector of claim 1, wherein the end surface of the second communication media is substantially coplanar with the end face of the support sleeve.

12. The communication media connector of claim 1, wherein the end surface of the second communication media is substantially parallel to the end face of the support sleeve.

13. A method, comprising:
providing a first media portion having a first end with a plurality of voids;
fusing a first end of a second media portion to the first media portion to form a media joint between the first and second media portions such that the second media portion is configured to receive data transmitted by the first media portion, the second media portion having a second end opposite the second media portion first end;
enclosing the media joint with a support sleeve having an end face configured to be selectively connected to a mating element, wherein the support sleeve defines an aperture extending through an entire length of the support sleeve, the aperture having a first internal diameter and expanding to a second internal diameter larger than the first internal diameter; and
forming an end surface of the second media portion at the second end, the end surface aligned with the end face such that the end surface is configured to selectively transmit the data received from the first media portion to the mating element; and
installing a stabilizing material about an interior surface of the aperture, the stabilizing material sealing the first and second media portions to inhibit intrusion of an external contaminant toward the media joint, wherein the stabilizing material extends laterally from the first media portion to the interior surface at the second internal diameter.

14. The method of claim 13, further comprising:
establishing the support sleeve aperture as having a first tubular portion and a second frusto-conical portion meeting at an aperture transition, the frusto-conical portion tapering outwardly extending away from the aperture transition; and
positioning the media joint within the support sleeve at the aperture transition.

15. The method of claim 13, further comprising establishing the second media portion as a single mode fiber configured to transmit the data only in a first direction.

16. The method of claim 15, further comprising establishing the first media portion as a hole-assisted optical fiber defining a plurality of voids distributed throughout the first media portion.

17. The method of claim 13, further comprising establishing an epoxy as the stabilizing material.

18. The method of claim 13, further comprising establishing a predetermined media joint distance as extending between the media joint and the end face of the support sleeve; and
positioning the media joint at the predetermined media joint distance according to at least an exposed length of the second media portion extending outside the support sleeve and an initial length of the second media portion.

19. The method of claim 13, further comprising establishing the end surface of the second communication media as substantially coplanar with the end face of the support sleeve.

20. A communication media connector, comprising:
a first media portion with a plurality of voids located at a first end;
a second media portion having first and second opposing ends, the first end of the second communication media joined to the first end of the first media portion at a media joint enclosing the plurality of voids, the second media portion configured to transmit data received from the first media portion;
a support sleeve disposed about the media joint, the support sleeve defining an end face, the second end of the second communication media defining an end surface aligned with the end face such that the end surface is configured to selectively transmit the data received from the first media portion to a receiving element, wherein the support sleeve and the second media portion cooperate to generally protect the plurality of voids from an external contaminant; and
a third media portion joined to the first media portion, wherein the first end of the second media portion defines a generally planar surface fused to the first end of the first media portion.

21. The communication media connector of claim 20, wherein the support sleeve defines an aperture extending through an entire length of the support sleeve, the aperture having a first internal diameter and expanding to a second internal diameter larger than the first internal diameter.

22. The communication media connector of claim 21, wherein the joint and the first and second media portions are secured within the support sleeve by a stabilizing material disposed laterally with respect to the joint, thereby providing lateral support against an interior surface of the support sleeve; wherein the stabilizing material extends laterally from the first media portion to the interior surface at the second internal diameter; and
wherein the third media portion is joined to the first media portion at a position along the first media portion, the position disposed laterally adjacent the second internal diameter.

* * * * *